Nov. 2, 1965   J. F. MEACHAM   3,215,899
DISTRIBUTION PANEL
Filed Dec. 30, 1958   7 Sheets-Sheet 1
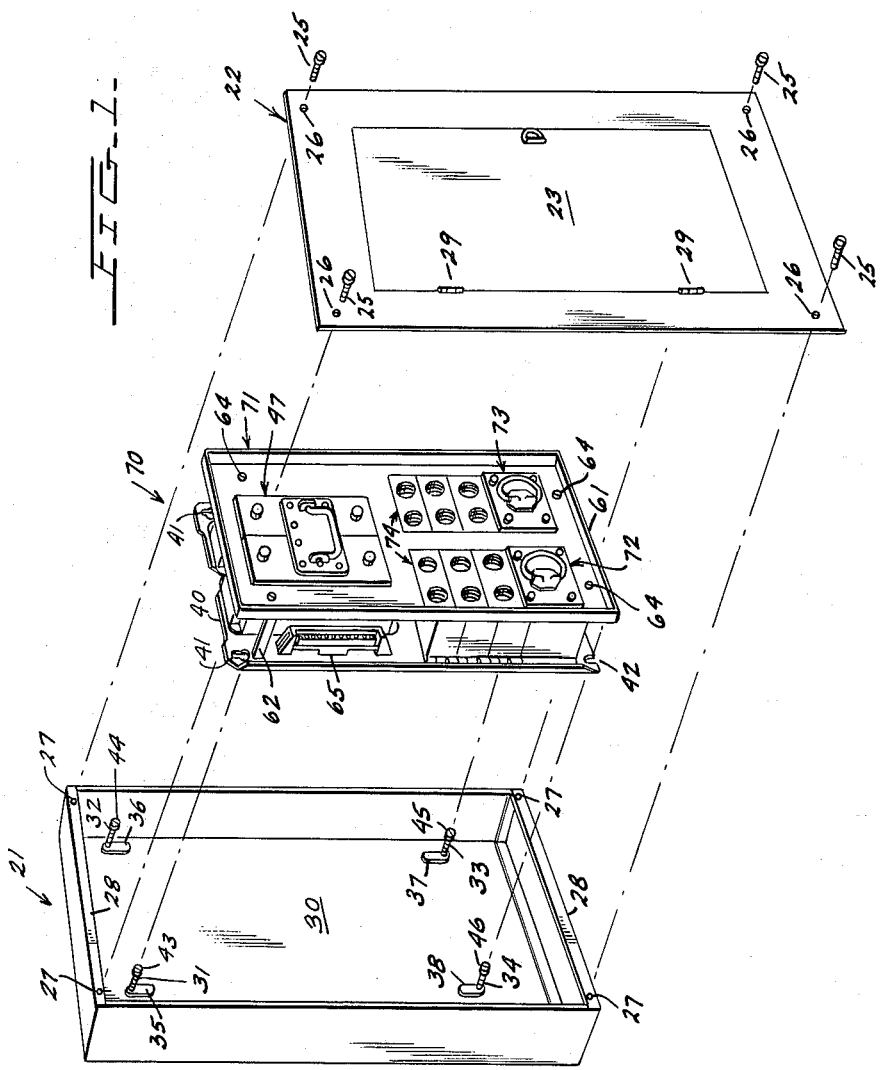
INVENTOR.
JAMES F. MEACHAM
BY
ATTORNEYS

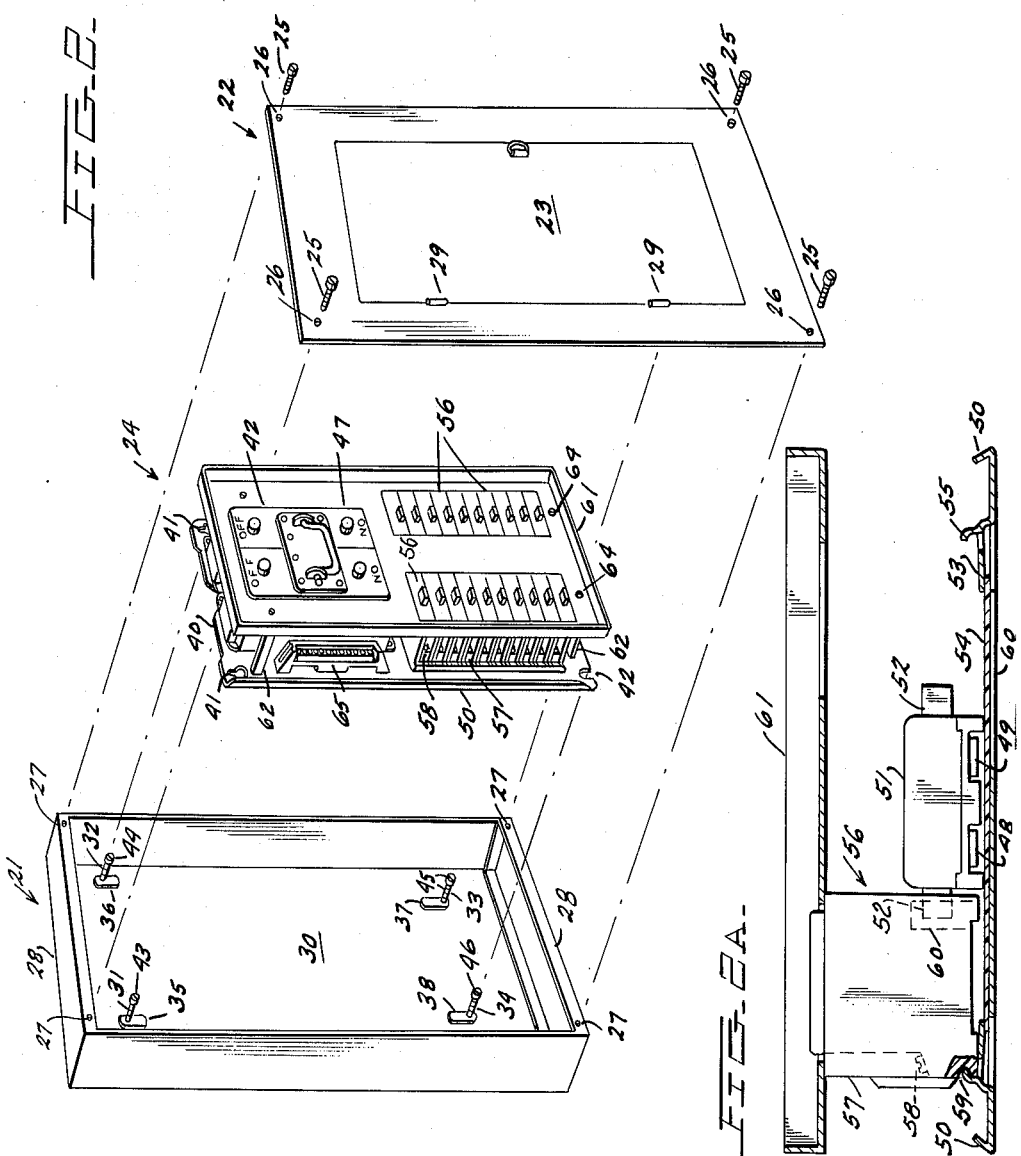

Nov. 2, 1965     J. F. MEACHAM     3,215,899
DISTRIBUTION PANEL
Filed Dec. 30, 1958     7 Sheets-Sheet 3
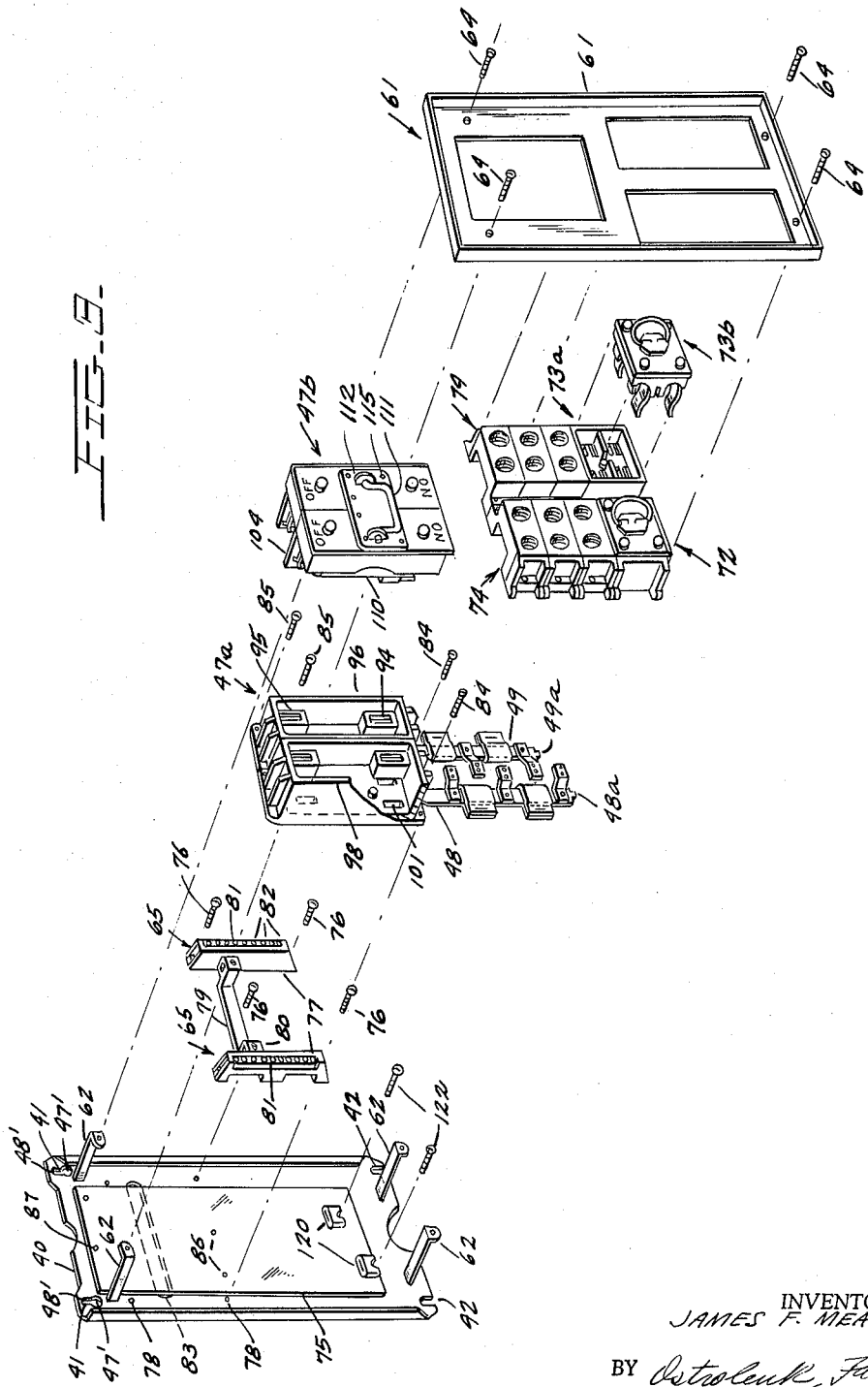
INVENTOR.
JAMES F. MEACHAM
BY
ATTORNEYS

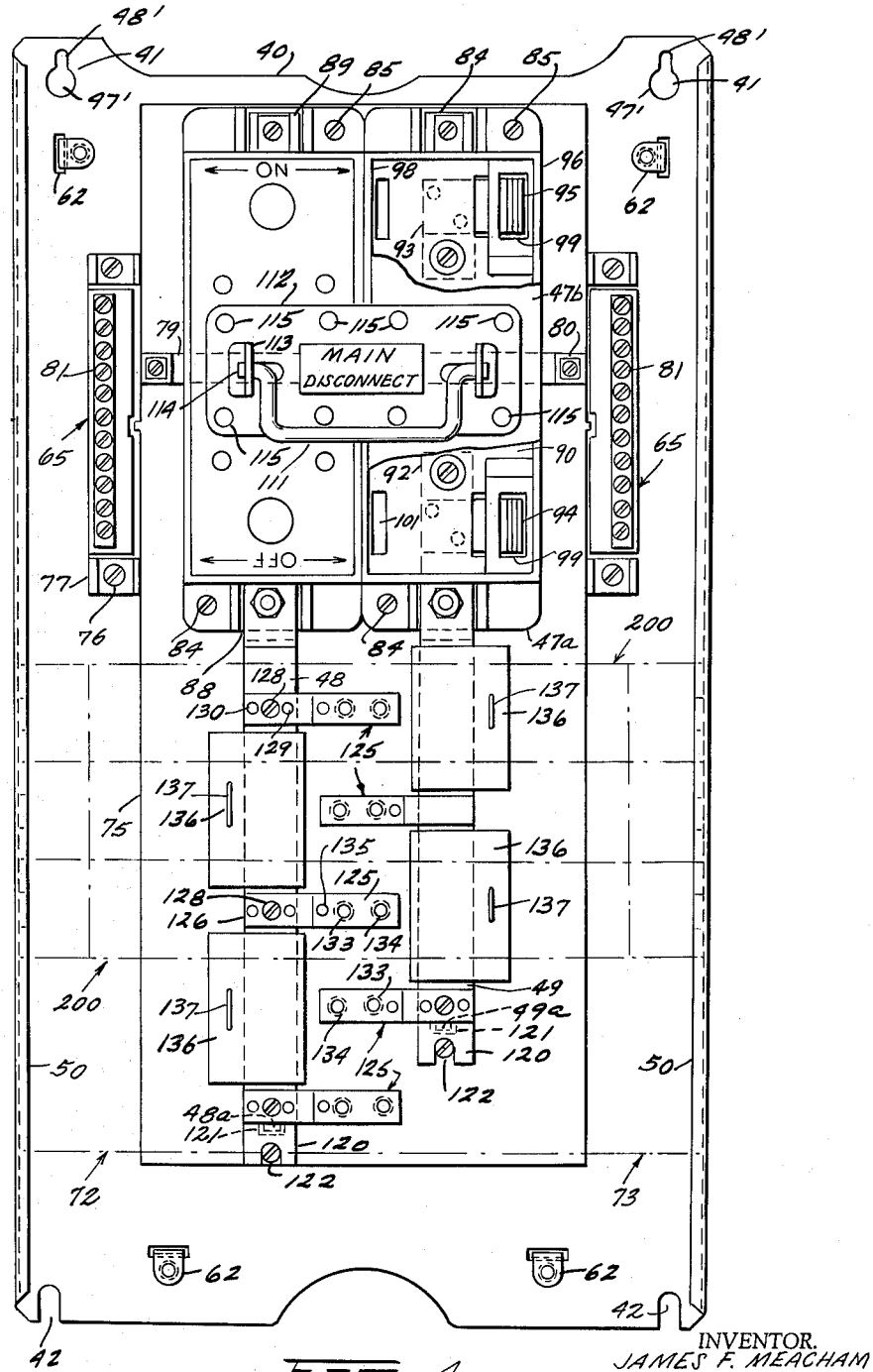

Nov. 2, 1965
J. F. MEACHAM
3,215,899
DISTRIBUTION PANEL
Filed Dec. 30, 1958
7 Sheets-Sheet 5
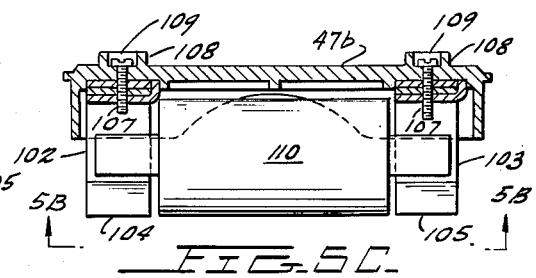
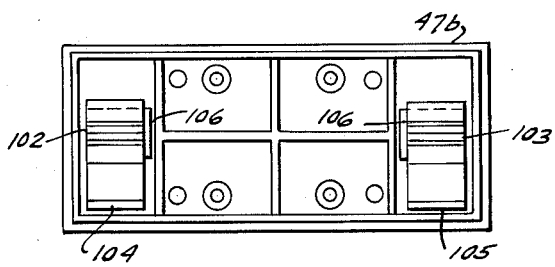
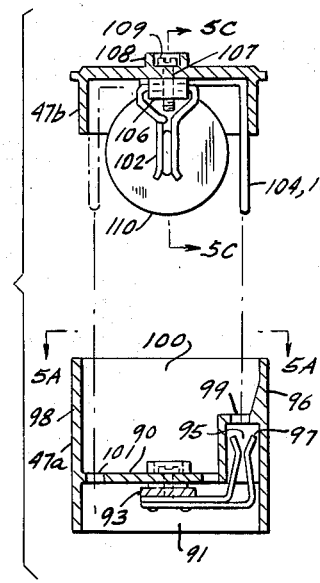
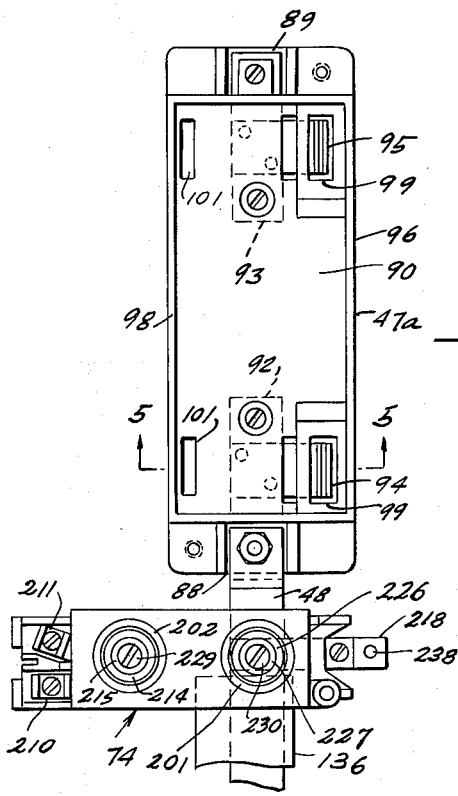
INVENTOR.
JAMES F. MEACHAM
BY
ATTORNEYS Nov. 2, 1965  J. F. MEACHAM  3,215,899
DISTRIBUTION PANEL
Filed Dec. 30, 1958  7 Sheets-Sheet 6

INVENTOR.
JAMES F. MEACHAM
BY Ostrolenk, Faber,
Gerb & Soffen
ATTORNEYS

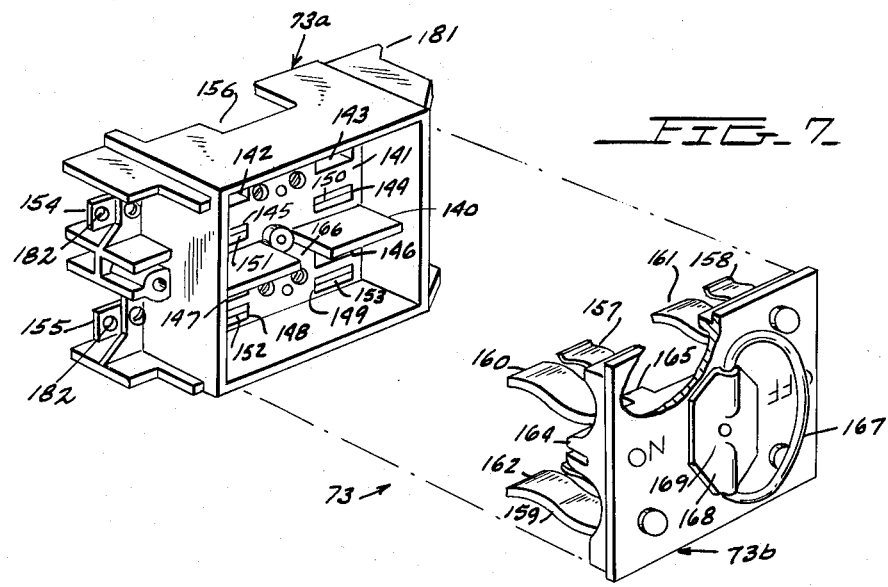

United States Patent Office 3,215,899
Patented Nov. 2, 1965

3,215,899
DISTRIBUTION PANEL
James F. Meacham, Atlanta, Ga., assignor to I-T-E Circuit Breaker Company, Philadelphia, Pa., a corporation of Pennsylvania
Filed Dec. 30, 1958, Ser. No. 783,857
1 Claim. (Cl. 317—119)

The instant invention relates to distribution panel constructions which include novel features whereby many common components may be utilized for the construction of two different panel interiors, one of which provides branch circuit protection by means of circuit breakers and the other of which provides branch circuit protection by fuse means.

Distribution panels are utilized as distribution points in electrical circuits to distribute the high current available at the main circuit to many branch circuits, each requiring a relatively low current. Means individual to each branch circuit, in the form of a fuse or circuit breaker, is provided at the panel to automatically interrupt its associated branch circuit and the main circuit whenever the current in that branch circuit exceeds a predetermined value thereby protecting the branch circuit connected devices from damage.

Accordingly, a primary object of the instant invention is to provide two different distribution panel assemblies one having a fusible interior and the other a circuit breaker interior with the interior backing plates of both panels being of the same overall dimensions and having the same mounting hole locations whereby either one or the other interior may be mounted within a common enclosure.

The provision of a common enclosure is advantageous in manufacturing as well as in distribution and warehousing. That is, in manufacturing a better utilization of tools is achieved while in distribution and warehousing only a single housing need be stocked. Manufacturing of the interiors is simplified in a similar manner by utilizing components, such as the main copper parts, which are common to both types of interiors.

For stiffening purposes, the backing plates of both interiors are provided with lips along the long edges thereof. The lips of the fusible interior backing plate are inwardly projecting, that is, they are positioned at acute angles with respect to the plate thereby providing a recess which receives a formation at one end of the branch circuit protection units to maintain these units in place.

The circuit breaker type interior is constructed to utilize circuit breakers of the type which are hooked into a cooperating formation on the mounting ledge and then rocked into contact directly with a main bus bar or an extension projecting therefrom. This mounting ledge, as well as the formations thereon, are integrally formed by piercing the backing plate.

Thus, another object of the instant invention is to provide novel means integrally formed with the backing plate to maintain one end of the branch circuit protection units in place.

Still another object is to provide a novel pullout type fused disconnect switch for the main circuit.

In the case of a single phase three wire system, an individual fuse assembly is provided for each of the ungrounded main conductors. Each fuse assembly comprises a box-like case having a removable cover. A pair of stationary contacts are mounted within the case while a pair of cooperating stationary contacts are mounted to the cover and extend upwardly therefrom, with a cartridge fuse also being mounted to the inside of the cover between the movable contacts.

A single handle means is mounted to the covers of both fuse assemblies so that both fuses are withdrawn simultaneously. The single handle means is loosely mounted to the covers so the relative positioning of the cases is not critical.

When the fuse carrying cover is mounted to the case in a first position such that the movable contacts are in engagement with the stationary contacts, an On indicator on the external side of the cover is readable when viewed from an upright position while an Off indicator is inverted at this time when viewed from an upright position. If the cover is mounted to the case in a second position rotated 180° from the first position the movable contacts do not engage the stationary contacts but are, instead, received by recesses in the bottom of the case. In this second position the Off indicator is readable when viewed from an upright position and the On indicator is inverted at this time. The second cover position is provided as a convenient means for storing the main circuit fuses while branch circuit connections are being made.

A further object of the instant invention is to provide a novel interlock means for branch circuit fuse disconnects of the pull-out type whereby a cover to which fuses of low rating are mounted may be inserted into a case connected in branch circuits of a rating corresponding to the fuse rating as well as into a case connected in branch circuits of a rating exceeding that of the fuse. At the same time a cover carrying higher rated fuses may be inserted into its own case but not into a case connected into a branch circuit of a lower rating.

A still further object of the instant invention is to provide a novel construction for a fuse block adapted to receive screw plug type fuses.

The fuse block is constructed to occupy half of the space occupied by a branch circuit fused disconnect yet the fuse block is constructed to mount two fuses which protect different branch circuits. The fuse receptacles are spaced along the longitudinal axis of the block with a single straight conductor extending from the center contacts of both fuse receptacles to the bus bars. The head of a single screw for each receptacle acts as a center contact for that receptacle while the screw mechanically maintains all of the receptacle components in place and also electrically connects the center contact to the single straight conductor.

The objects hereinbefore noted as well as other objects of the instant invention shall readily become apparent after reading the following description of the accompanying drawings in which:

FIGURE 1 is an exploded view of a distribution panel assembly utilizing fusible branch circuit protection devices.

FIGURE 2 is an exploded view of a distribution panel assembly wherein the interior assembly utilizes circuit breakers as the branch circuit protection devices.

FIGURE 2A is a transverse cross-section of the interior assembly of FIGURE 2 taken adjacent to the side of a circuit breaker.

FIGURE 3 is an exploded view of the interior assembly of FIGURE 1.

FIGURE 4 is a plan view of the interior assembly of FIGURE 1.

FIGURE 5 is a transverse cross-section of one of the main line protection devices with the cover withdrawn from the case, looking toward the line side.

FIGURE 5A is a plan view of the case of FIGURE 5 looking in the direction of the arrows 5A—5A.

FIGURE 5B is a plan view of the interior side of the cover of FIGURE 5 looking in the direction of arrows 5B—5B.

FIGURE 5C is a cross-section taken through lines 5C—5C of FIGURE 5 looking in the direction of the arrows.

FIGURE 7 is an exploded perspective of a pull-out type fusible disconnect utilized to protect a branch circuit having a high current requirement.

FIGURE 8 is an exploded perspective of a pull-out type fusible disconnect which is of the same overall dimensions as the disconnect of FIGURE 7 but is adapted to protect a branch circuit having a low current requirement.

Figure 6:
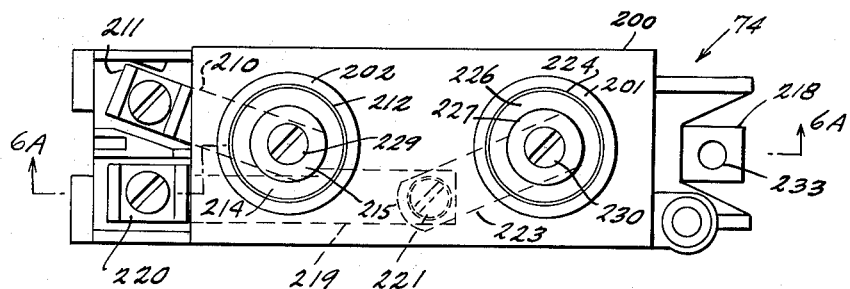
FIGURE 6 is a plan view of a fuse block which is adapted to receive two plug type fuses.

Now referring to the figures and more particularly to FIGURES 2 and 2A, the distribution panel assembly illustrated comprises a box-like enclosure 21, having a removable side assembly 22 including door 23, and an interior assembly 24. Screws 25 extend through clearance holes 26 in side assembly 22 and are received by threaded apertures 27 in the inwardly turned lips 28 of enclosure 21. Cover 23 is hinged at 29 so as to be pivotable about a vertical axis when panel assembly is mounted to a wall.

Inwardly extending studs 31–34 are fixedly secured to the back wall 30 of enclosure 21 adjacent to raised bearing formations 35–38, respectively. Nuts 43–46 are provided for each of the studs 31–34, respectively.

Backing plate 40 is provided, near its upper end, with two double width slots 41 and communicating with the lower edge thereof, two elongated slots 42, only one of which is shown in FIGURE 2. Double width slots 41 are spaced apart by a distance equal to the spacing between upper studs 31, 32 while slots 42 are spaced apart by a distance equal to the spacing between lower studs 33, 34. As shown in FIGURE 3, the lower portions 47' of the slots 41 are larger than nuts 43, 44 while the upper portions 48' of slots 41 are smaller than nuts 43, 44.

In order to mount interior assembly 24 within enclosure 21 it is necessary to rotate nuts 43–46 until they are near the free ends of their respective studs 31–34. Interior 24 is then moved toward back wall 30 until nuts 43, 44 pass through the enlarged portions 47' of slots 41. Thereafter, interior 24 is permitted to move downward with upper studs 31, 32 now finding their way into reduced portions 48' of slots 41 and lower studs 33, 34 being positioned within open ended slots 42. Nuts 43–46 are then tightened to force interior assembly 24 toward back wall 30 until backing plate 40 is firmly seated upon raised bearing portions 35–38.

As can be seen in FIGURES 2 and 3 interior assembly 24 is adapted for a single phase three-wire system and is, therefore, provided with a fusible disconnect means 47, the construction of which shall be hereinafter explained, for each of the hot conductors and a neutral terminal assembly 65 for the neutral or grounded wire.

Main bus conductors 48, 49 extend from the load terminals (not shown) of disconnect means 47 in directions substantially parallel to stiffening lips 50 positioned along the long edges of backing plate 40. As shown in FIGURE 2A, transversely extending stationary contact members 52 are longitudinally spaced and electrically connected in a well known manner to one or the other of bus conductors 48, 49 while being insulated from the other of the bus conductors 48, 49 by insulating block 51.

Circuit breaker mounting ledges 53, extending parallel to lips 50, are integrally formed with backing plate 40 by piercing thereof. Insulating sheet 54 is retained against backing plate 40 by being entered under ledges 53. A plurality of inwardly projecting hook-like extensions 55 are formed integrally with ledges 53 by piercing thereof.

Circuit breakers 56 are utilized for branch circuit protection and are of a conventional type which may include instantaneous and time delay automatic tripping means of the type described in U.S. Patent 2,769,049 assigned to the assignee of the instant invention, entitled "Quick-Break Circuit Breaker."

The load side 57 of circuit breaker 56, or the side thereof where load terminal 57 is located, is provided with a recess 59 adapted to receive one of the extensions 55. When an extension 55 is entered into recess 59 its circuit breaker 56 is located longitudinally with respect to bus conductors 48, 49 such that the circuit breaker 56 may be pivoted about extension 55 with a pair of spring fingers 60 forming the line terminal of circuit breaker 56 engaging a contact member 52 therebetween to simultaneously mechanically secure and electrically connect circuit breaker 56.

Trim means 61, in the form of a pan shaped member, is utilized to fill in the spaces between the two rows of circuit breakers 56 and the main circuit disconnect 47. Four standoffs 62, only two of which are shown in FIGURE 2, are riveted or otherwise secured at one of their ends to backing plate 40. The other ends of standoffs 62 are bent over and provided with tapped apertures which receive screws 64 to thereby secure trim means 61 in place.

FIGURE 1 illustrates a distribution panel assembly 70 wherein circuit breakers 56 are replaced by fusible means and utilizes many components which are identical to those of the panel assembly 24 of FIGURE 2. For the sake of clarity, like numbers have been utilized to designate like members of FIGURES 1 and 2. That is, enclosures 21 and side assemblies 22 of both FIGURES 1 and 2 are identical in every respect, the overall sizes of backing plates 40 are the same with the locations and sizes of slots 41, 42 being the same; pan-like trim means 61 are of the same overall size; standoffs 62, neutral assemblies 65, and main circuit disconnect means 47 are identical; and neutral strap 79 (shown in FIGURE 3) is identical. Thus, a single enclosure 21 may accept either interior assembly 24, which utilizes circuit breakers 56 as the branch circuit protection means, or interior assembly 70, which utilizes pull-out type fusible means 72, 73 or plug type fusible means 74 as the branch circuit protection devices. While they have not been illustrated, it is to be understood that enclosure 21 is provided with appropriate knockouts which may be removed as required in order to introduce external wiring.

As seen in FIGURE 3, neutral terminal assemblies 65 are disposed adjacent to the sides of main circuit disconnect means 47 and are secured to backing plate 40 by means of screws 76 which pass through clearance holes in insulating blocks 77 and are received by threaded apertures 78 in backing plate 40. U-shaped conducting strap 79 extends between terminals 80 to electrically connect both neutral assemblies 65. Each terminal 80 is electrically connected to tubular member 81 having a plurality of screw terminals 82 to which branch circuit connections are made.

The central portion of strap 79 is adjacent to insulating sheet 75, which covers most of the surface of backing plate 40, in alignment with transverse elongated slot 83 cut in plate 40. Slot 83 provides relief for sheet 75 so that disconnect means 47 will not be supported entirely by strap 79.

Referring to FIGURES 3–8, main circuit fusible disconnect means 47 is comprised of two identical single fuse units mounted side by side and mechanically ganged for simultaneous manual operation. For the sake of brevity, only one of the fuse units will be described.

Box-like case 47a is provided with a removable cover 47b.

Screw 84 at the load terminal 88 side of case 47a and screw 85 at the line terminal 89 side thereof are received by threaded apertures 86, 87 respectively in sheet 75 and plate 40 to rigidly secure case 47a to plate 40.

Wall 90 (FIGURE 5) forms a false bottom for case 47 thereby providing a space 91 for connecting straps 92, 93 which extend from terminals 88, 89, respectively, to stationary spring finger contacts 94, 95 respectively.

Contacts 94, 95 are disposed within case recesses 97 which communicate with space 91. Recesses 97 are provided with apertures 99 which communicate with the interior 100 of case 47a. Apertures 99 are positioned adjacent to one wall 96 of case 47a while another two other apertures 101 through wall 90 are positioned adjacent to wall 98, for a purpose to be hereinafter explained.

Spring finger fuse contacts 102, 103 and an associated movable contact 104, 105, respectively, are positioned at opposite ends of cover 47b on the interior side thereof. A separate clamp 106 and separate screw 107 secure each of the fuse contacts 102, 103 and associated movable contact 104, 105 to cover 47b. The heads of screws 107 are disposed within recesses in embossments 108 with an insulating sealer 109 filling in the recesses. Fuse contacts 102, 103 are adapted to receive a cartridge fuse 110 having axially extending contacts projecting from each end thereof.

Both covers 47b are mechanically connected to a single handle 111 by means of plate 112 provided with pierced ears 113 having apertures wherein the ends 114 of handle 111 are journaled. Plate 112 is positioned adjacent to the external sides of covers 47b and is secured thereto by eight rivets 115 having enlarged portions at both ends thereof of the sets of clearance holes through plate 112 and covers 47b which receive rivets 115, either one or both sets of holes are considerably larger than the bodies of rivets 115 yet smaller than the enlarged ends thereof. This permits relative movement between covers 47b so that the relative positions occupied by cases 47a need not be established to close tolerances.

When covers 47b are mounted to cases 47a in a first position such that the On indications (FIGURE 4) are readable from an upright position while the Off indications are inverted, movable contacts 104, 105 extend through apertures 99 and engage stationary contacts 95, 94, respectively. When covers 47b are rotated 180° from this first position to a second position the movable contacts 104 occupies the phantom position of FIGURE 5 and movable contacts 104, 105 extend through apertures 101 into space 91 and do not engage stationary contacts 94, 95.

This second position is utilized for storing fuses 110 when it becomes necessary to interrupt the main circuit. At this time the On indications are inverted and the Off indications are readable from an upright position. Thus, there is a readily observable indication that main circuit power is disconnected from all of the branch circuits.

As shown in FIGURE 4, bus conductors 48, 49 are secured at one of the ends thereof to load terminals 88 of main circuit protection device 47 while the other ends of bus conductors 48, 49 have axially extending reduced portions 48a, 49a, respectively, which are entered into recesses 121 of insulating blocks 120. Screws 122 pass through clearance openings in blocks 120 and insulating sheet 75 to be received by tapped openings (not shown) in backing plate to thereby securing blocks 120 to backing plate 40. It is to be noted that bus conductor 49 is shorter than bus conductor 48.

Each of the bus conductors 48, 49 is provided with a plurality of transversely extending conducting straps 125 which are adapted to have the line terminals of branch circuit protection devices 72, 73, 74 of FIGURE 3 electrically and mechanically connected thereto. Since all five straps 125 and their mode of mounting are identical, only one strap 125 shall be described.

Figure 6A:
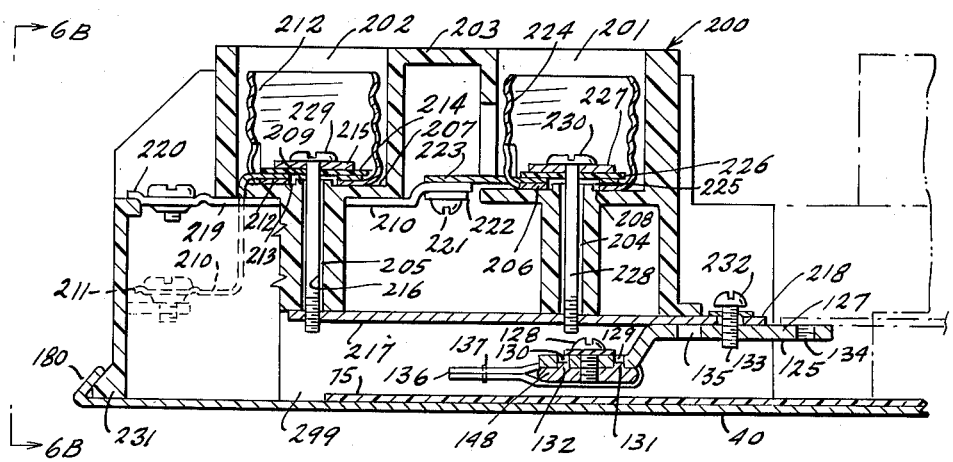
FIGURE 6A is a longitudinal section of the fuse block of FIGURE 6 taken through lines 6A—6A looking in the direction of the arrows.

As shown in FIGURES 4 and 6A, strap 125 comprises a first portion 126 abutting bus conductor 48 and a second portion 127 offset from first portion 126 so as to be a greater distance from backing plate 40. Screw 128 passes through a clearance hole in first strap portion 126 and is received by a threaded aperture in bus conductor 48. Apertures 129, 130 are provided in first portion 126 on opposite sides of the clearance hole which receives screw 128. Bus conductor embossments 131, 132 are entered into apertures 129, 130, respectively, thereby preventing rotation of strap 125. Second portion 127 is provided with two tapped openings 133, 134 for the purpose of making load connections and a clearance opening 135.

The portions of bus conductors 48, 49 not occupied by straps 125 are surrounded by insulation means 136. Insulation means 136 comprises a bent over sheet whose marginal edges are secured together by a staple 137.

Pull-out type fusible disconnects 73, 72, FIGURES 7 and 8, respectively, comprise box-like cases 73a, 72a and covers 73b, 72b for each of the cases 73a, 72a, respectively. The outside configurations and sizes of both cases 72a, 73a are identical as are the outside configurations and sizes of both covers 72b, 73b.

Case 73a is similar in construction to case 47a in that the construction and securement of the stationary contacts are the same for both. The interior of case 73a is divided in two portions by a longitudinally extending partition 140 which extends into case 73a from false bottom 141. Bottom 141 is provided with eight apertures 142–149 with one set of stationary spring finger contacts 150, 151 being in alignment with apertures 144, 145, respectively, and stationary spring finger contacts 152, 153 being in alignment with apertures 148, 149, respectively. Stationary contacts 151, 152 are electrically connected to line terminals 154, 155, respectively, while the other stationary contacts 150, 153 are electrically connected to load terminals (not shown) which are of the same construction as load terminals 154, 155. These terminals carry the respective wire grips 154', 155' (FIGURE 8). Stepped notch 156 is formed in the false bottom portion of the case side wall to provide clearance for bus bars 48, 49 and straps 125.

Fastened to the interior side of cover 73b are four U-shaped spring clips only three of which 157–159 are shown. Clips 157, 158 are positioned to engage the ferrules of one cartridge fuse (not shown) while the other clips are positioned to engage the ferrules of another cartridge fuse. One of the arms of each clip 157–159 as well as the clip not shown are longer than the other arm thereby forming movable contacts 160–162, respectively.

When cover 73b is mounted to case 73a in the position shown in FIGURE 7, one set of stationary contacts 150, 151 are engaged by movable contacts 161, 160, respectively and the other set of stationary contacts 152, 153 are engaged by movable contact 162 and the movable contact not shown. When cover 73b is rotated from its position of FIGURE 7 and mounted to case 73a movable contacts 160–162 as well as the movable contact not shown, will extend through apertures 142, 143, 146, 147 in false bottom 141.

The interior side of cover 13b is provided with a longitudinal wall formation 164 having a projecting formation 165 at the center of its free edge. Formation 165 cooperates with depression 166 in case partition 140 to provide an interlock means as will be hereinafter explained.

Half-loop handle 167 having inwardly extending ends is rotatably mounted to the external side of cover 73b by positioning the ends in suitably formed pockets of plate 168. Rivets 169 rigidly secures plate 168 to the external side of cover 73b.

Case 72a (FIGURE 8) is the mirror image of case 73a except that depression 166 of partition 140 is filled by rod-like formation 170. Accordingly, like reference numerals in FIGURES 7 and 8 designate identical elements. Similarly, the external elements of covers 72b and 73b are identical so that like reference numerals have been utilized.

Four fuse clips 171–173 and one not shown are secured to the interior side of cover 72b and are each associated with an individual movable contact 175. An individual strap 176 connects each fuse clip 171–173 and the one not shown to its associated movable contact 175. Rivet 177 secures strap 176 to its associated fuse clip while screw 178 secures strap 176 and its associated movable contact 175 to cover 72b.

It is to be noted that the fuse clips of cover 72b are more closely spaced than are the fuse clips of cover 73b. Since this is so, the fuses carried by cover 72b will usually be of a lower current rating than the fuses carried by cover 73b.

It is also to be noted that wall formation 164 of cover 72b is provided with a central depression 179 which is adapted to receive case formation 170 thereby permitting cover 72b to be mounted to case 72a. Since cover 72b is the same overall size as cover 73b the former may also be mounted to case 73a. However, it is not possible to mount cover 73b to case 72a since case formation 170 will engage cover formation 165.

Inwardly extending lips 50 are integrally formed along the long edges of backing plate 40 are bent over at less than 90° with respect to plate 40 to form a slot adapted to receive wedge formations 181 at the load sides of cases 72a and 73a for mechanical securement thereof. The load sides of cases 72a and 73a are secured in place by screws (not shown) which pass through clearance holes 182 in line terminals 154, 155 and are received by a threaded aperture 133 in a strap 125 secured to one of the bus conductors 48, 49 and a threaded aperture 134 in an adjacent strap 125 secured to the other of bus conductors 48, 49.

Figure 6B:
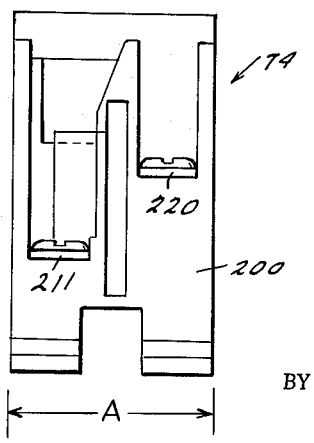
FIGURE 6B is an end view of the fuse block of FIGURE 6 looking in the direction of arrows 6B—6B of FIGURE 6A.

Circuit protection devices 74 utilizing plug type fuses are illustrated in FIGURES 6–6B. Elongated fuse block 200 is provided with circular cavities 201, 202 communicating with the top surface 203 of block 200. Elongated clearance openings 204, 205 extend through block 200 from the substantially closed bottoms 206, 207, respectively of cavities 201, 202, respectively. Ring-like lips 208, 209 surround the top ends of openings 204, 205, respectively.

Threaded metal shell 212, having a central opening 213 in the bottom thereof, is disposed within cavity 202. One end of offset strap 210 serves as a load terminal 211 while the other end extends through an opening in the side of shell 212 and is provided with a clearance opening which receives lip 209. Insulating disk 214 is positioned near the bottom of shell 212 abutting strap 210 and atop disk 214 is washer 215. Screw 216 passes through openings in washer 215, disk 214, strap 210, shell 212 and then through block opening 205 to engage a threaded formation in one end of straight conductor strip 217. As screw head 229 is worked toward the bottom 207 of cavity 202 disk 214 forces strap 210 into good electrical contact with shell 212 since the upper surface of strap 210 is slightly above the upper surface of lip 209. The other end 218 of conductor strip 217 serves as a line terminal for both plug fuses (not shown) mounted to block 200.

Threaded metal shall 224 having a central opening 225 in the bottom thereof, is disposed within cavity 201. One end of conductor 219 serves as load terminal 220 while the other end is secured by screw 221 and lock washer 222 to conductor 223 whose other end extends through an opening in the side of shell 224 and is provided with a clearance opening which receives lip 208. Insulating disk 226 is positioned near the bottom of shell 224 abutting conductor 223 and atop disk 226 is washer 227. Screw 228 passes through openings in washer 227, disk 226, conductor 223, shell 224 and then through block opening 204 to engage a threaded formation of straight conductor strip 217 intermediate the ends thereof.

Thus, it is seen that screws 216 and 228 serve three functions. That is, screws 216 and 218 mechanically secure the elements of their respective fuse receptacles, provide electrical connections to line terminal strip 217, and screw heads 229 and 230 act as center terminals for the plug fuses which will be received by shells 212 and 224, respectively.

Branch circuit protection device 74 is mounted to backing plate 40 by inserting the wedge formation 231 at the load end of block 200 into one of the slots formed by integrally formed lips 180. If formation 231 is engaged by lip 180 near the bus conductor 148 (FIGURE 6A) and line terminal 218 is to be connected to a transverse strap 125 secured to bus 148 then screw 232 passes through clearance opening 233 in line terminal 218 and is received by strap threaded opening 133. Thus, screw 232 electrically secures protection device 74 and provides a line connecting means therefor. The side walls of block 200 are provided with cutouts which form a clearance opening 299 for bus conductor 48.

With one device 74 mounted as shown in FIGURE 6A a complementary device 74 mounted with its formation 231 captured by lip 180 nearest bus conductor 49 will have its associated line connection screw 232 received by threaded opening 134 if it is desired to make the electrical connection to bus conductor 48.

It is to be noted that the width A of block 200 is equal to one half the width B of case 72a so that two devices 74 may be replaced by either one of the branch circuit protection devices 72 and 73.

Thus, this invention provides a novel simplified construction for distribution panel assemblies in which an interior utilizing fusible branch circuit protection devices may be replaced by an interior utilizing circuit breaker branch circuit protection devices with a common enclosure being constructed to receive one or the other of the interiors. In constructing both types of interiors, common components have been utilized to the utmost.

Although I have here described preferred embodiment of my novel invention, many variations and modifications will now be apparent to those skilled in the art, and I therefore prefer to be limited, not by the specific disclosure herein, but only by the appended claim.

I claim:

A panel interior for the distribution of single phase main circuit power to a plurality of branch circuits; said interior including an elongated backing plate and a neutral means mounted thereto, a main circuit disconnect means, two elongated main circuit bus conductors, and a plurality of branch circuit protection devices; said disconnect means having a line side adapted to receive a first and a second main circuit conductor; said neutral means being adapted to receive a third main circuit conductor whose potential is between the potentials of said first and said second main circuit conductors; said disconnect means also having a load side; said bus conductors extending from said load side substantially parallel to the long edges of said backing plate; insulating means interposed between said bus conductors and said backing plate; line terminal means at a first end of each of said plurality of branch circuit protection devices; means mechanically securing each of said first ends and electrically connecting the line terminal means of their respective devices to at least one of said bus conductors; securing means integrally formed with said backing plate extending forward thereof and in operative engagement with a recess provided in a second end of each of said plurality of branch circuit protection devices opposite to said first end, constructed to mechanically secure said second ends, said securing means comprising a mounting ledge formed from a stamped out region of said backing plate, with said stamped out region defining a backing plate opening, said mounting ledge extending forward of said backing plate and covering said backing plate opening, a hook-like extension formed from said mounting ledge and extending forward thereof, each of said recesses having an individual one of said hook-like extensions entered therein.

(References on following page)

References Cited by the Examiner

UNITED STATES PATENTS

| | | | |
|---|---|---|---|
| Re. 23,797 | 3/54 | Miller | 317—119 |
| 1,794,952 | 3/31 | Fuller | 317—114 |
| 1,910,686 | 5/33 | Frank | 317—116 |
| 1,946,071 | 2/34 | Harvey | 317—116 |
| 2,156,479 | 5/39 | McWhorter | 317—117 |
| 2,593,961 | 4/52 | Ballou | 317—99 |
| 2,871,284 | 1/59 | Wills | 317—119 |
| 2,902,631 | 9/59 | McRoberts | 317—119 X |
| 2,934,660 | 4/60 | Brunner | 317—119 |
| 2,961,512 | 11/60 | Stanback et al. | 200—114 |
| 2,997,628 | 8/61 | St. John | 317—119 |

FOREIGN PATENTS 696,340　8/53　Great Britain.

JOHN F. BURNS, *Primary Examiner.*

SAMUEL BERNSTEIN, LARAMIE E. ASKIN,
*Examiners.*